(12) United States Patent
Macquart et al.

(10) Patent No.: US 7,037,577 B2
(45) Date of Patent: *May 2, 2006

(54) GLASS SUBSTRATES COATED WITH A STACK OF THIN LAYERS HAVING REFLECTIVE PROPERTIES IN THE INFRA-RED AND/OR SOLAR RANGES

(75) Inventors: Philippe Macquart, Asnieres (FR); Olivier Guiselin, Paris (FR); Veronique Rondeau, Drancy (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/880,092

(22) Filed: Jun. 30, 2004

(65) Prior Publication Data

US 2004/0241457 A1    Dec. 2, 2004

Related U.S. Application Data

(60) Continuation of application No. 10/460,206, filed on Jun. 13, 2003, now Pat. No. 6,804,048, which is a division of application No. 09/337,463, filed on Jun. 21, 1999, now Pat. No. 6,602,587, which is a continuation of application No. 08/577,925, filed on Dec. 22, 1995, now Pat. No. 5,935,702.

(30) Foreign Application Priority Data

Dec. 23, 1994    (FR) .................................. 94 15566

(51) Int. Cl.
*B32B 17/06* (2006.01)

(52) U.S. Cl. ...................... 428/216; 359/359; 359/580; 359/585; 428/336; 428/432; 428/472; 428/698; 428/701

(58) Field of Classification Search ................ 428/216, 428/336, 428, 432, 472, 698, 701; 359/359, 359/580, 585
See application file for complete search history.

(56) References Cited

U.S. PATENT DOCUMENTS 5,047,131 A    9/1991    Wolfe et al.

(Continued)

FOREIGN PATENT DOCUMENTS

EP    0 303 109    2/1989

(Continued)

*Primary Examiner*—Archene Turner
(74) *Attorney, Agent, or Firm*—Oblon, Spivak, McClelland, Maier & Neustadt, P.C.

(57) ABSTRACT

A transparent substrate particularly of glass, provided with a stack of thin layers having at least one metallic layer (4) having properties in the infrared range particularly having low emissivity and two coatings having a base of dielectric material located one (8) under and the other (9) over the layer having properties in the infrared range, as well as a protective metallic layer (5) place immediately over an in contact with the layer having properties in the infrared range, characterized in that in order to prevent the modification of properties of the stack, particularly optical and thermal properties, in the case where the substrate is submitted to a thermal treatment of the tempering or bending kind, firstly the second coating (9) having a base of dielectric material, includes a barrier layer for the diffusion of oxygen chosen from the following materials: components of silicon $SiO_2$, $SiO_xC_y$, $SiO_xN_y$, nitrates such as $Si_3N_4$ or AlN, carbides such as SiC, TiC, CrC, TaC of a thickness of at least 10 nanometers and preferably of at least 20 nanometers, and secondly the layer having properties in the infrared range is directly in contact with the underlying dielectric coating.

30 Claims, 1 Drawing Sheet

U.S. PATENT DOCUMENTS

| | | | |
|---|---|---|---|
| 5,110,662 A | 5/1992 | Depauw et al. | |
| 5,170,291 A | 12/1992 | Szczyrbowski et al. | |
| 5,183,700 A | 2/1993 | Austin | |
| 5,506,037 A | 4/1996 | Termath | |
| 5,510,173 A | 4/1996 | Pass et al. | |
| 5,520,996 A | 5/1996 | Balian et al. | |
| 5,543,229 A | 8/1996 | Ohsaki et al. | |
| 5,595,825 A | 1/1997 | Guiselin | |
| 5,718,980 A * | 2/1998 | Koch et al. | 428/698 |
| 5,834,103 A * | 11/1998 | Bond et al. | 428/216 |
| 5,837,361 A * | 11/1998 | Glaser et al. | 428/336 |
| 5,891,556 A | 4/1999 | Anderson et al. | |
| 5,935,702 A * | 8/1999 | Macquart et al. | 359/585 |
| 5,965,246 A | 10/1999 | Guiselin et al. | |
| 6,238,781 B1 | 5/2001 | Anderson et al. | |
| 6,287,675 B1 | 9/2001 | Guiselin et al. | |
| 6,337,124 B1 | 1/2002 | Anderson et al. | |
| 6,602,587 B1 * | 8/2003 | Macquart et al. | 428/472 |
| 6,804,048 B1 * | 10/2004 | MacQuart et al. | 359/359 |

FOREIGN PATENT DOCUMENTS

| | | | |
|---|---|---|---|
| EP | 678484 | * | 4/1994 |
| EP | 622645 | * | 11/1994 |

\* cited by examiner

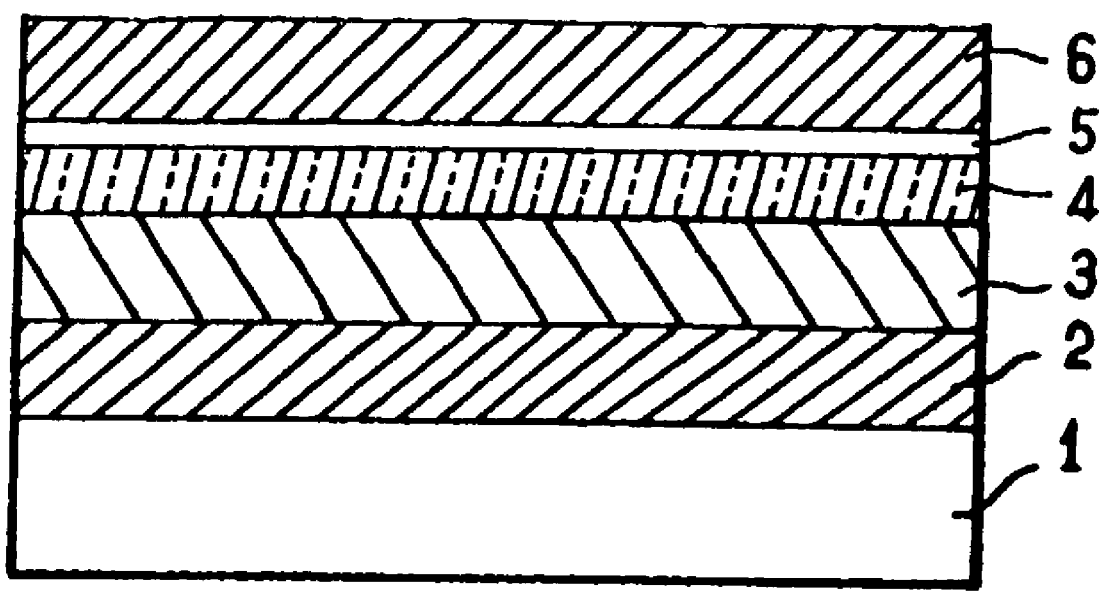
FIG_1

GLASS SUBSTRATES COATED WITH A STACK OF THIN LAYERS HAVING REFLECTIVE PROPERTIES IN THE INFRA-RED AND/OR SOLAR RANGES

The present application is a Continuation of U.S. application Ser. No. 10/460,206, filed Jun. 13, 2003, now U.S. Pat. No. 6,804,048, which is a Divisional of U.S. application Ser. No. 09/337,463, filed Jun. 21, 1999, now U.S. Pat. No. 6,602,587, which is a Continuation of U.S. application Ser. No. 08/577,925, filed Dec. 22, 1995, now U.S. Pat. No. 5,935,702, the entire contents of each of which are hereby incorporated by reference.

BACKGROUND OF THE INVENTION

1. Field of the Invention

The present invention relates to transparent substrates, particularly of glass coated with a stack of thin layers having at least one metallic layer enabling it to act upon solar radiation and infra-red radiation of long wavelength.

2. Discussion of the Background

One known type of a stack of thin layers for providing transparent substrates with thermal properties, particularly with low emissivity, is formed mainly by a metallic layer, particularly of silver, disposed between two coatings of dielectric material based upon a metal oxide. This type of stack is generally made by a succession of depositions carried out using a vacuum with cathodic sputtering assisted by a magnetic field. Two very thin metallic layers can also be provided on both sides of a silver layer, the underlying layer acting as a protective or "sacrificial" layer so as to avoid oxidizing the silver, if the oxide layer overlaying it is deposited by reactive sputtering in the presence of oxygen.

If the silver layer essentially determines the thermal anti-solar and/or low emissivity performance of the final glazing, the layers of dielectric material fulfill several roles, because they act in the first place on the optical aspect of the glass in an interferential manner. They also protect the silver layer from chemical and/or mechanical damage. Thus, French Patent FR-B-2 641 271 describes a stack where the silver layer is intercalated between two coatings of dielectric material, such of the coatings being formed of a plurality of layers of metallic oxide. The underlying coating of the silver layer is formed of the oxide layers superimposed on a layer of stannic oxide, that layer adjacent to the silver layer being of zinc oxide and having, according to this patent, the effect of protecting the silver, notably by making it less vulnerable to attack by oxygen. On the other hand, the thickness of the zinc oxide layer is small, because the zinc oxide, which is hardly resistant would endanger, if it were too great, the whole assembly of the stack. The layers of dielectric material which surround the silver layer protect it in this way against attack and can also optimize its quality for improving its priming or wetting, as described in European Patent Application No. EP-A-0 611 213.

Currently more and more low emissivity or anti-solar functional glazing is required having, in addition, substrates with inherent characteristics, particularly anesthetic (which may be curved), having mechanical characteristics (which may be more resistant) or for safety glass (which does not cause injury when broken).

This requires that the glass substrates be subjected to thermal treatment for bending, annealing or tempering. If this is carried out with conventional stack coating without any precaution or adaption of the thin layers, the silver layer tends to be irreversibly degraded, completely deteriorating the thermal properties thereof. This is for several reasons, however, primarily because of the heating effect, the silver layer is oxidized by diffusion of the atmospheric oxygen across the layers which overlay it. It also tends to be oxidized by diffusion of the oxygen of the glass across the underlying layers. Lastly, it may tend to be excessively altered in contact with alkaline ions, such as sodium ($Na^+$) migrating from the glass across the underlying layers. The diffusion of the oxygen or alkaline ions can be facilitated and amplified by the deterioration or the structural modification of the oxide layers themselves caused by the heating effect.

A first solution is to increase very significantly the thicknesses of the thin layers previously mentioned, on either side of the silver layer. If sufficiently tick they can effectively "screen" and protect the silver layer. If it also manages to practically preserve the thermal properties of the stack unchanged, particularly as regards its emissivity, on the other hand by modifying the optical properties, the two metal layers are oxidized mainly because of the silver layer, and they cause, particularly, a great increase in the light transmission $T_L$.

Low emissivity tempered glazing can also be obtained after the deposition of the layers having a $T_L$ value greater than 80%, which is clearly inferior to this value before tempering. It can also be particularly noted in European Patent Application No. EP-A-0 506507 that a temperable stack is described, with one silver layer disposed between a layer of tin and a layer of nickel-chrome-chrome. However, it is clear that having been tempered, the coated glass with such a stack was until then considered to be a semi-finished product of no use as such, since its light transmission value of about 60% to 70% was hardly compatible with the current market for low emissivity highly transparent glazing.

The inconvenience which inevitably follows is that it is, therefore, absolutely necessary to provide at the same time, two types of stack having low emissivity layers and/or anti-solar layers, one for non-tempered glass and the other for glass destined to be tempered or bent, and which is also complicated regarding research and development requirements, particularly, for the management of production stock.

SUMMARY OF THE INVENTION

Accordingly, one object of this present invention to reduce or eliminate such disadvantages by providing a new type of low emissivity stack and/or with anti-solar properties having thin layers which perform optically and thermally and which retain these properties even if the carrier substrate is subjected to thermal treatment for tempering or bending.

These objects and others are provided by a transparent substrate having a stack of thin layers and having at least one metallic layer having low emissivity in the infra-red range and two coatings having a base of dielectric material located, one under and the other over the layers having low emissivity in the infra-red range, and a protective metallic layer placed immediately over and in contact with the layers having low emissivity in the infrared range; and further containing i) a second coating having a base of dielectric material including a barrier layer for the diffusion of oxygen selected from among silicon oxides, silicon or aluminum nitrides, or carbides of a thickness of at least 10 mm and having low emissivity in the infrared range and being in direct contact with the underlying dielectric coatings.

BRIEF DESCRIPTION OF THE DRAWINGS

FIG. 1 schematically illustrates a glass substrate overlaid with a stack in accordance with the present invention.

DESCRIPTION OF THE PREFERRED EMBODIMENTS

The object of the invention is therefore to reduce this inconvenience, seeking to produce a new type of low emissivity stack and/or with anti-solar properties having thin layers which perform optically and thermally and which retain these performances and that its carrier substrate may be then submitted or not to thermal treatment for tempering or bent.

The invention also relates to transparent substrates particularly of glass coated with a stack of thin layers having at least one metallic layer enabling it to act on solar radiation and on infrared radiation of a long wavelength, particularly reducing the emissivity thereof through the glass.

The invention further relates to the use of such substrates for making thermal insulation and/or solar protective glazing, hereinafter called "functional" glazing. This glazing can be used equally well for buildings or vehicles, so as to particularly to reduce the amount of air conditioning and/or reduce excessive overheating resulting as a consequence of solar rays traversing the glass surfaces in rooms and passenger compartments.

A transparent substrate, particularly of glass, according to the present invention is provided with a stack of thin metallic layers with at least one layer having properties in the infrared range, particularly having low emissivity, and two coatings having a base of dielectric material situated one under and the other over the layer having an infrared properties, as well as a protective metallic layer, placed immediately underneath and in contact with the layer having infrared properties, a substrate in which, in order to prevent the modification of the properties of the stack, particularly optical and thermal properties in the event that the substrate, is submitted to a thermal treatment for bending or tempering.

Firstly, the second coating having a dielectric material base with a barrier layer for the diffusion of oxygen is chosen from the following materials: compounds of silicon, such as $SiO_2$, $SiO_xC_y$, $SiO_xN_y$; nitrides like $Si_3N_4$ or AlN; carbides like SiC, TiC, CrC or TaC of a thickness of at least 10 nanometers and preferably at least 20 nanometers.

Secondly, the layer with infrared properties is directly in contact with the underlying dielectric coating.

The specific advantages of each material retained by the barrier layer for the diffusion of oxygen, will be set out in detail below. However, they can be generally into two categories. First, compositions of silicon and nitride are mainly transparent materials and do not, therefore, penalize the stack of layers in terms of light transmission. Therefore, it is an advantage to choose a barrier layer therefrom for a glass with a functional layer of a low emissivity high transparency type. Second, and on the contrary, carbides are relatively absorbent materials which tend to reduce light transmission. One, therefore, resorts to providing barrier layers rather when glass is wanted for functional layer glass of an anti-solar type with reduced light transmission.

The configuration of the stacks according to the present invention also provides moreover that the layer having properties in the infrared range may not be separated from the coating having a base of dielectric material itself placed on the glass by means of any metallic layer. In effect such a layer when it is present is absorptive before any thermal treatment. In such a treatment the oxide, at least partially, and its transmission increases, leading to a noticeable difference in the optical characteristics of the stack before and after the thermal treatment.

This is a very advantageous technical result, but is also unexpected. Prior to the present invention, when it was desired to make a low emissivity layered stack which could be tempered or bent, it was considered indispensable to provide relatively thick metal layers in direct contact with each face of the functional layer. These layers protected it from oxidizing instead of the function layer.

It has now been surprisingly discovered that the presence of the protective metallic layer and the barrier layer for the diffusion of oxygen, according to the present invention, both being above the layer with infrared properties, are sufficient to ensure the temperability or the curvability of the stack without modifying its properties. The functional layer is not damaged by high temperature, even if it is in direct contact with the metal oxide layers on at least one of its faces.

It could be believed, on the contrary, however, that a direct contact with an oxide provokes oxidization of the functional layer at high temperature, by diffusion of constituent oxygens in this layer.

Temperable stacks can also be formed according to one aspect of the present invention of the following type:

oxide(s)/silver/m/oxide(s) barrier layer the M layer being a very thin layer of metal which can be shown to be necessary, as explained hereafter, simply as a normal protective layer when the deposition of the layer is carried out by reactive sputtering and the layer of oxide(s) above the M layer is/are optional.

From this scheme, all the variants concerning the type and number of layers under the functional layer or between the barrier layer and the functional layer, preferably of silver, may be employed.

As far as the barrier layers, silicon nitride and aluminum nitride are particularly advantageous in view of the objective of the invention, and fulfill several very important conditions. First, they are able to block the diffusion of oxygen also at a high temperature. Second, a sufficient amount above the functional layer serves as a barrier ensuring its integrity, even if the substrate is bent or tempered after deposition. Third, they are largely inert faced with an attack by an oxidant substance which shows they do not undergo any chemical modification (of an oxidation kind) or notable structural modification during tempering or bending. They do not, therefore, provoke any optical modification of the stack when tempering or bonding, particularly in terms of the level of light transmission.

Besides, their use in a low emissivity type stack does not involve any particular complication in its manufacture. It is not necessary to readjust in any particular manner the thickness of each "normal" layer of such a stack, particularly because they have a refractive index near most metal oxides used as dielectric coatings, such as oxides of zinc, tin, tantalum and niobium. They can be replaced by this type of metal oxide or be associated with certain oxide types as set out below. Silicon nitride $Si_3N_4$ has a refractive index of about 2.1 and aluminum nitride an index of about 2.

The silicon nitride used is preferably as dense and as pure as possible. If it is preferred to deposit the assembly of layers by a cathodic sputtering technique under vacuum, it would be advantageous to elect to deposit silicon nitride by reactive sputtering from a target area of silicon in the presence of $N_2$. In this case, in order to improve the conductivity of the target area, it may be found necessary to add a dopant such as boron. The layers of silicon nitride according to the present invention may thus contain some boron, but preferably in a proportion of at most 2% atomic compared to the silicon. In the remainder of the present text the term "silicon nitride" relates not only to pure $Si_3N_4$ but also to $Si_3N_4$ containing impurities of a dopant nature. The deposition of the $Si_3N_4$ layer can be carried out by a CVD plasma type technique (CVD means "Chemical Vapor Deposition" a gaseous phase pyrolysis) as described in U.S. Pat. No. 5,288,527.

Advantageously, the deposition conditions are also regulated so that the silicon nitride has a density near the theoretical density, particularly at least 80% of the theoretical density. A high density ensures an optimum barrier effect against oxygen, even if one uses layers of silicon nitride of a relatively slight thickness. It is the same if a nitride of aluminum is chosen, also preferably obtained by a reactive cathodic sputtering technique under a vacuum from a target area of aluminum in the presence of $N_2$.

The choice of silicon oxide, more particularly to form the barrier layer of the first dielectric coating in contact with the glass is an advantageous variation. In fact, it is a material which, like silicon nitride, forms an effective barrier for the diffusion of oxygen and alkalines. In addition, however, it has a refractive index of about 1.45 very near that of the carrier substrates of the stack, the substrate being of glass. If then the silicon oxide layer is deposited directly on the glass, which is the preferred arrangement, this layer hardly interferes with the optical aspect of the layers of the stack confer on the substrate in the assembly. It can then be given only a sufficient thickness of 10 nanometers or more to ensure its effectiveness as a barrier layer and then overlaid with layers of dielectric material based on conventional metal oxides and or known thicknesses which fulfill the desired optical role, with the reservation that these oxides must support very high temperatures without structural modification sufficiently important for the optical features of the stack to be caused to deteriorate as will be set out below.

When a silicon oxide based layer is chosen rather than a silicon nitride or aluminum nitride based layer in the first coating with a dielectric material basis, such a layer can also be obtained by cathodic sputtering from a target area of doped silicon, but this time in the presence of oxygen. The dopant can be, particularly boron or aluminum. The oxide based layer can also include a small quantity of boron or aluminum, particularly in a proportion of at most 2% atomic compared to the silicon. As above for nitride, the term "based on silicon oxide" means for purposes of the present invention an oxide also containing "dopant" type impurities such as boron or aluminum.

Deposition by sputtering under vacuum at a radio-frequency can be employed. The $SiO_2$ layer can also be deposited by other techniques than cathodic sputtering, particularly by CVD plasma from an appropriate siliceous precursor or by a gas phase pyrolysis under ambient pressure. If it is a matter of the first layer of the stack, one can then choose to deposit it on a ribbon of float glass directly, continuously, particularly with the help of precursors of the tetraethylorthosilicate TEOS variety. Using the same technique, it is also possible to deposit on the $SiO_2$ layer other layers, for example $TiO_2$. Such methods are described for example is EP Patent No. B-0230 188.

The barrier layers based on $SiO_xC_y$ or $SiO_xN_y$ are very useful and have the advantage of having variable refractive indices as a function of their carbon or nitrogen level. The same deposition techniques can be used as for the $SiO_2$ layers: reactive cathodic sputtering, deposition by CVD plasma or by pyrolysis under ambient pressure (particularly directly on a ribbon of float glass before cutting up, continuously, with the help of a combination of $SiH_2$ type and ethylene precursors in the case of a layer of $SiO_xC_y$ as described in European Patent No. EP-0 518 755).

The carbide based barrier layers, as mentioned above have the characteristic of being relatively absorbent and are, therefore, reserved for the manufacture of glass where it is not imperative to have a high light transmissivity. They can be deposited by reactive sputtering, particularly in the presence of $C_2H_2$ or $CH_4$ or non reactive sputtering from carbide targets. One can also choose to deposit by CVD plasma.

The functional metallic layer is advantageously of silver. Its thickness can be selected between 7 and 13 nanometers, particularly between 9 and 12 nanometers if low emissivity and high light transmission is required (particularly where $T_L$ is at least 70 to 80%) particularly for rather cold countries. If one wants anti-solar reflective glass designed rather for buildings in hot countries, the silver layer can be chosen to be thicker, for example up to 20 to 25 nm. This results clearly in glass with light transmissivity distinctly lower, particularly lower than 60%.

The protective layer provided on the functional layer is advantageously chosen to be of a metallic nature, particularly from niobium (Nb), tantalum (Ta), titanium (Ti), chromium (Cr) or nickel (Ni) or an alloy of at least two of these metals, such as an alloy of niobium and tantalum Nb/Ta, of niobium and chromium Nb/Cr or tantalum and chromium Ta/Cr or a nickel-chrome alloy. It preserves the normal function of the "sacrificial" layer for protecting the functional layer in case of a deposition by reactive sputtering. If this sputtering is carried out in the presence of $O_2$ so as to deposit an oxide, the superficial layer is effectively necessary, preferably having a thickness of at most 2 nm and of the order of 0.5 to 1.5 nm. In the final stack, it is partially as seen as essential, oxidized. If this sputtering is carried out in the presence of $N_2$ to deposit a nitride, this protective layer is not absolutely necessary. It is however preferable: it is indeed proven that the underlying functional layer, particularly of silver may also risk deterioration by its contact with reactive nitrogen. Since the reactivity of nitrogen is slighter than that of oxygen, it can be very thin, particularly less than or equal to 1 nm. In the final stack it can be partially, seen as essential, nitrated.

One can also attribute to this protective layer a supplementary function, that of "controlling" the value of light transmission, when it is desired to make anti-solar glass with previously reduced light transmissivity. Indeed, modifying the thickness of the protective layer to a thickness of, for example, 8 to 10 nanometers enables very precise adjustment of the light transmission for example between 50 and 60%.

The second coating of dielectric material of the stack above the functional layers has a preferred total geometric thickness of between 30 and 60 nanometers, particularly between 35 and 45 nanometers.

A first variant not only has a barrier layer, particularly chosen from a base of silicon or aluminum nitride, which is simpler for the deposition installation, but not so good as regards the speed of deposition of the stack.

A second variant has a barrier layer, such as the last layer of the stack, particularly of silicon or aluminum nitride, a barrier layer which is associated with at least another layer of dielectric material which is not susceptible to noticeable structural modification, particularly of a crystallographic order, at high temperatures, of a metal oxide kind, particularly of zinc oxide ZnO. In this arrangement, the silicon nitride of the "outer" layer, fully acts as a barrier. The underlying layer(s) of oxide have then a beneficial effect on the light transmission when very high transmissivity is to be obtained.

The metal oxides of ZnO type are stable and inert at. high temperature, and do not lead to deterioration of the functional layer. This shows that they do not diffuse their oxygen atoms to the functional layer, when curving, tempering or when reheating is effected.

The underlying coating, called a primer, is in the context of the present invention a layer which is in direct contact with the functional layer and which is designed to facilitate its adhesion, to increase its coupling with the lower layers and/or increase its durability or its optical and thermal properties.

Metallic oxide as a base is not susceptible to structural modification particularly from a crystallographic view, at high temperature risking the stack to be penalized. Preferably, it is a layer of zinc oxide (ZnO).

As noted above, the zinc oxide is not noticeably modified in the structural plane when subjected to heat; above all it is protected from contact with oxygen and alkalines, and further it has very interesting priming or wetting properties with respect to low emissivity silver type functional layers. This layer of oxide does not tend to penalize the stack as regards light transmissivity, so that it can, therefore, be made much thicker than in the previous case, particularly using a thickness of between 5 and 40 nanometers, preferably between 15 and 30 nanometers. With such a thickness, this layer can contribute further to its priming function, adjusting the optical aspect of the stack in association with the first coating of dielectric material.

A general description of the stack with the first coating of dielectric material, may be completed by describing the component on the substrate, below the metallic oxide layer which is not susceptible to structural modifications.

A first variant consists in only forming the carrier layer with a refractive index of about 2, particularly of AlN or of $Si_3N_4$.

A second variant consists in preferably using a layer of material with a refractive index less than 2, of $SiO_2$, $SiO_xC_y$, $SiO_xN_y$. One advantageous example is a layer of $SiO_2$ because the refractive index is very similar to that of the glass substrate.

A third variant consists in using another kind of a stable metal oxide, which is not modified structurally at a high temperature.

The thickness of the first coating located under the functional metallic layer, which may be the chosen variant so that the total optical thickness of the dielectric layers under the functional layer gives the stack optical characteristics, particularly satisfactory calorimetric characteristics. The total geometric thickness of the coating can be chosen particularly to be between 15 and 50 nanometers. If the barrier layer of the first coating is of $SiO_2$, the thickness can be clearly very important, $SiO_2$ having an index near that of glass.

The stack of layers according to the present invention may be exemplified by the following kind:

glass/$Si_3N_4$ or AlN/ZnO/Ag/Nb/$Si_3N_4$ or glass/$Si_3N_4$/ZnO/Ag/Nb/ZnO/$Si_3N_4$ or glass/$SiO_2$ or $SiO_xC_y$/ZnO/Ag/Nb/ZnO/$Si_3N_4$ or AlN or finally glass/$SnO_2$/ZnO/Ag/Nb/$Si_3N_4$ The present invention also provides a transparent substrate, particularly of glass, with a stack of thin layers having at least one layer with properties in the infrared range, particularly with low emissivity, disposed between an underlying priming or wetting coating (which may have an oxide base) itself disposed on a first coating having a base of dielectric material and an upper optional protective layer overlaid on a second coating having a base of dielectric material. The present invention consists in preventing the modification of the properties of the stack, particularly optical and thermal properties, in the case where the carrier substrate may be submitted to a thermal treatment of the curving or tempering kind, which entails two characteristics:

first, the first coating with the dielectric material base has at least one barrier layer for the diffusion of alkaline ions and oxygen, particularly at least 10 or 15 nanometers thick, and second, the second coating with the dielectric material base has at least a barrier layer for the diffusion of oxygen, particularly at least 10 to 15 nanometers, preferably at least 20 nanometers thick.

Each of the barrier layers is advantageously chosen from a base of one of the following materials:

a composition of silicon, such as an oxynitride of silicon ($SiO_xN_y$), oxycarbide of silicon ($SiO_xN_y$), or silicon oxide ($SiO_2$), a nitride, such as silicon nitride ($Si_3N_4$) and aluminum nitride (AlN), a carbide, such as chromium carbide (CCr), silicon carbide (SiC), titanium carbide (TiC) or tantalum carbide (TaC).

This variant of the invention is represented particularly by the combination:

glass/$Si_3N_4$/Nb/Ag/Nb/$Si_3N_4$ which is uses a primer layer as well as a protective layer having layers of a metallic nature. Furthermore, as with certain of the preceding layers, this possesses two extreme barrier layers which prevent, at the time of their thermal treatment, the diffusion let it be of alkaline ions of the glass especially $Na^+$ for the lower layer, or let it be oxygen for the upper layer, these two elements $Na^+$ and $O_2$ are likely to degrade the functional layer particularly when it is of silver.

The present invention may also be applied advantageously to stacks having not only one metallic functional layer of silver but also several. It is then necessary to provide the number and thickness of barrier layers sufficient to preserve the assembly of layers from oxidization in case of thermal treatment, and particularly at least one silicon nitride or aluminum nitride layer on the first functional layer. In order to obtain a slight variation of the optical properties and especially for the transmission of light, it is essential not to have a metallic layer under the metallic functional layers.

At least in the case of stacks having a single metallic functional layer, good optical and thermal performance is obtained. The invention also enables glass to be obtained with low emissivity and highly transparent with particularly carrier substrates for the stack which when mounted in double glazing have at the same time a high $T_L$ of at least 74 to 80% and low emissivity of at most 0.06 and even about 0.05. But this is very important, that is the properties are kept almost intact (indeed also improved) if the carrier substrates of the stacks are submitted, after deposition, to thermal treatment by bending, reheating or tempering which could involve heating to about 620° C. or more: the variations in light transmissivity of the glass due to such treatment are at most 2% and the variations in emissivity are at most 0.01 with further very little calorimetric modification, particularly as regards reflection.

Several advantages result. First, a single stack of layers (low emissivity or anti-solar) for each type of glass sufficient for the manufacture of tempered as well as untempered glass which facilitates stock management and enables great easiness in adapting very rapidly the production of functional glass which may be tempered or not as required.

Second, one can also assemble indifferently on a facade of a building, for example tempered and untempered glass since the eye will not be able to detect any disparity between the total optical appearance of the facade. It should also be possible to sell untempered coated glass, leaving to the buyer the discretion of tempering or not whilst enabling him to guarantee a consistency in their optical and thermal properties.

Glass which is bent, reheated or tempered or not can therefore, provide absolutely equivalent performance by virtue of the present invention.

The details and advantageous characteristics of the invention will now be described with reference to FIG. 1 without being limited thereto.

It is specified that the successive deposition of thin layers in all the examples is carried out by a cathodic sputtering technique assisted by a magnetic field but can also be carried out by any other technique permitting good control of the layer thicknesses to be obtained.

The substrates on which are deposited the stacks of thin layers are substrates of a clear soda-lime-silica glass of the Planilux type as sold by Saint-Gobain Vitrage.

In FIG. 1, the glass substrate 1 is overlaid with a stack according to the invention successively a coating 8 eventually composed of a barrier layer 2 for the diffusion of oxygen and Na$^+$ ions, and a primer layer 3, then a low emissivity layer 4 of silver, a protective layer 5 also called a "sacrificial" layer, then finally again a second coating having a dielectric material base 6 has particularly a barrier layer 7 of oxygen. This figure is very schematic and for clarity does not represent the thicknesses of the various materials shown.

The present invention will now be further illustrated by the following Examples which are provided solely for purposes of illustration and are not intended to be limitative.

Examples 1 to 4 in accordance with the present invention. Example 5 is a comparative example.

EXAMPLE 1

This example uses two barrier layers 2, 6 both based on $Si_3N_4$ for surrounding and protecting silver layer 4 in case of thermal treatment.

This is a stack of the following kind:

glass/$Si_3N_4$/ZnO/Ag/Nb/$Si_3N_4$ which uses an oxide primer layer 3.

The deposition installation contains at least a sputtering chamber with cathodes having target surfaces of appropriate materials under which the substrate 1 passes successively. The deposition conditions for each layer are recommended by the following two examples:

silver layer 4 is deposited with the aid of a target surface of silver at a pressure of $8\times10^{-3}$ mbar (0.8 Pa) in an atmosphere of argon, layers 2 and 7 having a base of silicon nitride are deposited with the aid of a target surface of silicon doped with 1% boron by reactive sputtering in an atmosphere of nitrogen at a pressure of $1.5\times10^{-3}$ mbar (0.15 Pa), primer layer 3 which is of ZnO is deposited with the aid of a target surface of zinc by reactive sputtering in an atmosphere of argon/oxygen where the volume of oxygen is about 40% at a pressure of $8\times10^{-3}$ mbar (0.8 Pa), protective layer 5 of Nb is deposited with the aid of a target surface of Nb by sputtering in an inert atmosphere of argon at a pressure of $8\times10^{-3}$ mbar (0.8 Pa).

The potential densities and passage speeds of the substrate are adjusted so as to obtain the desired thicknesses of the layers.

Table 1 below indicates the kind of layers and their thicknesses in nanometers, the stack of Example 1 using substrates 3 millimeters thick.

TABLE 1

|  | EXAMPLE 1 |
| --- | --- |
| $Si_3N_4(2)$ | 20 |
| ZnO(3) | 20 |
| Ag(4) | 10 |
| Nb(5) | 1 |
| $Si_3N_4(7)$ | 40 |

The substrate of Example 1 once coated with its stack of layers, is then submitted to a thermal treatment consisting of heating to about 620° C. followed by cooling.

Table 2 below indicates before and then after thermal treatment, their light transmissivity value $T_L$ as a percentage. Their reflective value $R_L$, also as a percentage, the reflective values of $a''_R$ and $b''_R$ in the calorimetric system (L, a*,b*) without units. All the measurements are made with reference to an illuminant $D_{65}$. Also thee are indicated their emissivity values $\in$ without units.

TABLE 2

| | EXAMPLE 2 (monolithic substrate) | |
| --- | --- | --- |
| | Before thermal treatment | After thermal treatment |
| $T_1$ | 85.2 | 83.8 |
| $R_1$ | 4.3 | 4.1 |
| $a^*_{(R)}$ | 4.3 | 6.8 |
| $b^*_{(R)}$ | −10.6 | −10.9 |
| $\in$ | 0.05 | 0.06 |

A second Example 1a has been made with exactly the same stacks as previous Example 1. The only difference is that it has been deposited this time on substrate 1 of the same nature but having a thickness of 4 mm, the substrate is then mounted as double glazing with another substrate of clear glass 4 mm thick with a 16 mm layer of intercalated argon.

The following Table 3 shows the characteristics $T_L$, $R_L$, $a^*_{(R)}$, $b^*_{(R)}$ and $\in$ for double glazing firstly when the coated substrate is not heated (without thermal treatment column) and secondly when the coated substrate is before mounting submitted to thermal treatment (heated to 620° C. then cooled).

TABLE 3

| | EXAMPLE 1a (double glazing) | |
| --- | --- | --- |
| | Before thermal treatment | After thermal treatment |
| $T_1$ | 77 | 76 |
| $R_1$ | 12 | 11 |
| $a^*_{(R)}$ | 1.2 | 2.3 |

TABLE 3-continued

| | EXAMPLE 1a (double glazing) | |
|---|---|---|
| | Before thermal treatment | After thermal treatment |
| $b^*_{(R)}$ | −4.9 | −4.8 |
| $\epsilon$ | 0.053 | 0.062 |

EXAMPLE 2

This Example 2 uses the following stack:

glass/Si₃N₄/ZnO/Ag/Nb/ZnO/Si₃N₄

The only difference, therefore, from Example 1 is that there is an additional layer 6 of ZnO intercalated between the protective layer 5 of Nb and the barrier layer 7 of $Si_3N_4$. This layer of ZnO is deposited in the identical way as ZnO layer 3 called a primer layer under silver layer 4 (refer to the deposition conditions previously described). Substrate 1 of clear glass is 4 mm thick. The thicknesses in nanometers of each layer is set out in Table 4 below.

TABLE 4

| | EXAMPLE 2 |
|---|---|
| $Si_3N_4(2)$ | 20 |
| ZnO(3) | 10 |
| Ag(4) | 10 |
| Nb(5) | 1.5 |
| ZnO(6) | 5 |
| $Si_3N_4(7)$ | 35 |

Two coated substrates absolutely identical to each other having such a stack are each mounted for double glazing with each substrate of clear glass 4 mm thick with a layer of argon 16 mm thick intercalated, one substrate being previously submitted to a heating of 620° C. then cooled whilst the other substrate is not.

Table 5 below gives the values of $T_L$, $a^*_{(R)}$, $b^*_{(R)}$ and $\epsilon$ of the two double glazings.

TABLE 5

| | EXAMPLE 2 (double glazing) | |
|---|---|---|
| | Without thermal treatment | After thermal treatment |
| $T_1$ | 79 | 80 |
| $a^*_{(R)}$ | 1.46 | 3.39 |
| $b^*_{(R)}$ | −3.94 | −2.2 |
| $\epsilon$ | 0.05 | 0.046 |

EXAMPLE 3

This Example uses this time a first barrier layer 2 of $SiO_2$ with the following stack:

glass/SiO₂/ZnO/Ag/Nb/ZnO/Si₃N₄

The $SiO_2$ layer is deposited from a target surface of silicon doped with aluminum by reactive sputtering doped with aluminum in the presence of an argon/$O_2$ mixture.

The other layers are deposited as before. The thicknesses in nanometers of the layers of the stack are set out in Table 6 below:

TABLE 6

| | EXAMPLE 3 |
|---|---|
| $SiO_2(2)$ | 40 |
| ZnO(3) | 40 |
| Ag(4) | 10 |
| Nb(5) | 1.5 |
| ZnO(6) | 5 |
| $Si_3N_4(7)$ | 35 |

Next the same mounting operations of mounting as double glazing are carried out with and without thermal treatment of the coated substrate. The heating is simply advanced here to 630° C.

Table 7 below gives the values of $T_L$, $a^*_{(R)}$, $b^*_{(R)}$ and $\epsilon$ in the two cases:

TABLE 7

| | EXAMPLE 3 (double glazing) | |
|---|---|---|
| | Without thermal treatment | After thermal treatment |
| $T_1$ | 76 | 77 |
| $a^*_{(R)}$ | −0.82 | 0.24 |
| $b^*_{(R)}$ | −2.49 | −2.12 |
| $\epsilon$ | 0.059 | 0.045 |

EXAMPLE 4

This Example 4 uses the following stack:

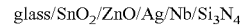
glass/SnO₂/ZnO/Ag/Nb/Si₃N₄

Outside the superficial $Si_3N_4$ barrier layer, this stack is like a normal stack, and uses materials well known in low emissivity layers formed by cathodic sputtering, in particular $SnO_2$ which is the most usual dielectric material.

In an unexpected manner, differing from the prior art where to obtain a good performance against corrosion and especially during thermal treatment, it needs or should have two barrier layers of the type $Si_3N_4$ (see example of European Patent Application EP-A-0 567 735) or rather at least two metal sacrificial layers on both side of the functional layer (see for example document EP-A-0 229 921), here neither one nor the other is used to guarantee the stability of the stack at the temperature.

Table 8 shows in effect the results:

TABLE 8

| | EXAMPLE 4 (double glazing) | |
|---|---|---|
| | Without thermal treatment | After thermal treatment |
| $T_1$ | 74 | 74 |
| $a^*_{(R)}$ | +0.5 | +0.8 |
| $b^*_{(R)}$ | −5.9 | −5.6 |
| $\epsilon$ | 0.06 | 0.05 |

These results were obtained with a product very easy to make (thicknesses of the layer in nm):

| $SnO_2$ | (2) | 10 |
| ZnO | (3) | 30 |

-continued

| | | |
|---|---|---|
| Ag | (4) | 10 |
| Nb | (5) | 1.5 |
| Si$_3$N$_4$ | (7) | 40, | are very surprising overall when one compares them to those of the stack see Example 5.

COMPARATIVE EXAMPLE 5

This comparative Example uses a stack with a silver layer of the type marketed by Saint-Gobain Vitrage under the name PLANITHERM. It uses, as in example 4 for its under layer, layers of tin oxide as a dielectric coating with, a for 4, on each side of the silver layer a layer of significant thickness of a nickel-chrome alloy. The substrate is 4 mm thick. The silver layer is deposited as before. In an known manner, the tin oxide SnO$_2$ is deposited by reactive sputtering from a target surface of tin in an atmosphere of N$_2$/O$_3$. The NiCr layers are deposited by sputtering in an inert atmosphere from a target surface of Ni/Cr.

The stack is set out in Table 9 below, the thicknesses being indicated always in nanometers.

TABLE 9

| Glass | Comparative Example 5 |
|---|---|
| SnO$_2$ | 35 |
| NiCr | 3 |
| Ag | 9–10 |
| NiCr | 6 |
| SnO$_2$ | 35 |

Table 10 below indicates the same data as the previous Table 9 for the coated substrates of this stack mounted in the same manner as double-glazing having been submitted to a thermal treatment at 630° C. then cooled, or without thermal treatment.

TABLE 10

| | COMPARATIVE EXAMPLE 5 (double glazing) | |
|---|---|---|
| | Without thermal treatment | After thermal treatment |
| T$_1$ | 61 | 73 |
| R$_1$ | 11 | 11 |
| a*$_{(R)}$ | 4.1 | −0.26 |
| b*$_{(R)}$ | −1.6 | −1.73 |
| ε | 0.08 | 0.08 |

Different comments can be made in view of these results.

In tables 2, 3, 5, 7 and 8 it can be seen that the stacks of the invention result in supporting heating of the order of 620, 630 or 640° C. without particular modification of the light transmissivity T$_L$ (with hardly 2% variation) nor of the emissivity (at most 0.01 variation). The thermal treatment does not affect in any significant manner the calorimetric aspect of the reflection of the "layer side" of the substrate. It may be emphasized in this respect that 640° C. is a particularly high temperature, tempering of glass usually being carried out at about 615–620° C. One can, therefore, guarantee a safety margin which is important in an industrial context in case of slight mishaps in the heating provided by standard tempering furnaces for glass.

In Examples 1 to 4 of the invention, it may be seen that the performance level may be modulated, particularly the emissivity which one looks for, whether the glass is tempered or not, the choice of the composition of the first coating of dielectric material and the primer layer turn out to be important for optimizing said performances.

Thus, the substrate of Example 1 using a primer layer based on oxide succeeds in having an emissivity of 0.083 when mounted in double glazing before tempering (Table 5).

Example 2 using two ZnO layers has very good emissivity performance, but also a value of T$_L$ which reaches a mark of 80% for double glazing after thermal treatment which is excellent (see Table 7).

The examples of the invention have in common that their emissivities change very slightly in the case of thermal treatment but "in a good sense" that is in the sense of diminution, it shows that the sliver layers do not lose their quality, on the contrary, this is sometimes very advantageous and surprising.

As recalled previously, the colorimetry of the examples of the invention is very satisfactory, whether or not with thermal treatment, with a very neutral reflective color provided by very low values of a* and B* as particularly concerning Example 3 (see Table 8).

A surprising enough characteristic that Examples 2 and 3 of the invention have equally in common is that their light transmissivity varies very slightly in the case of thermal treatment, but here again "in a good sense", that is in the sense of an increase while similarly they both use oxide primer layers.

Finally, comparative Example 5 shows the limits of a solution consisting in making "temperable" a low emissivity stack protecting the sliver layer with metallic layers susceptible to oxidation: if the thermal performance can thus be preserved, it is not the same as concerns the optical aspect: more than 10 points of difference between T$_L$ without and with thermal treatment (see Table 10) which is in all probability due to the oxidation of Ni/Cr layers on both sides of the silver layer, as well as a considerable variation in the values of a*$_{(R)}$.

Moreover it has been note that it is important that, if one chooses to deposit "intercalated" oxide layers between the barrier layers 2, 7 and silver layer 4, these may be chosen so that thermal treatment may not effect their structure. Thus Examples 1 and 4 of the invention use a ZnO layer under and possibly over the silver layers. The inventors have verified that it was, as deposited, at least partially crystallized and that it essentially preserved this crystallization state when heated to 620 or 640° C.

It may also be judicious to select oxides deposited in an amorphous state and having the particular feature of remaining thus when heated. The inventors have on the other hand, carried out a similar trial to Example 1, replacing ZnO layer 3 with an SnO$_2$ layer 3 deposited like comparative example 5. It is noted that the properties of the silver layer above the SiO$_2$ layer were significantly deteriorated after thermal treatment. Curiously, this may be due in fact to a particular structural modification of the crystallographic structure of SnO$_2$ under considerable heating. The results of Example 4 where the same SnO$_2$ is only found separate from the silver by a layer of ZnO are quite as surprising.

Having described the present invention, it will be apparent to one of ordinary skill in the art that many shaped and modifications may be made to the above-described embodiments without departing from the spirit and the scope of the present invention.

What is claimed is:

1. A transparent substrate, comprising a stack of thin layers having at least one layer with properties in the infra-red range, which comprises on a carrier substrate in order:
   a) a first undercoating comprising a dielectric material;
   b) a layer having properties in the infra-red range;
   c) a primer metallic coating, and
   d) a second overcoating, comprising dielectric material;
   wherein in order to prevent modification of properties of the stack when a carrier substrate thereof is submitted to a thermal treatment of bending or tempering;
   i) the first undercoating comprising dielectric material has at least a first barrier layer for the diffusion of alkaline ions and oxygen; and
   ii) the second overcoating comprising dielectric material has at least a second barrier layer for the diffusion of oxygen; and further wherein
   iii) a first oxide layer is intercalated between the first undercoating and said layer having properties in the infrared range, and a second oxide layer is also intercalated between said primer metallic coating and the second overcoating, said first and second oxide layers being the same or different;
   the first barrier layer and second barrier layer each, independently, being selected from the group consisting of silicon nitride and silicon oxynitride.

2. The transparent substrate of claim 1, wherein the oxide layer intercalated between the primer metallic coating and the second overcoating is a ZnO or $SnO_2$ layer.

3. The transparent substrate of claim 1, wherein the first undercoating and the second overcoating is a $Si_3N_4$ layer.

4. The transparent substrate of claim 1, wherein the carrier substrate is glass.

5. The transparent substrate of claim 1, wherein a difference in luminous transmission, TL, after bending or tempering up to a temperature of 640° C., is at most 2%, with an emissivity difference of at most 0.01.

6. The transparent substrate of claim 1, wherein said primer metallic coating comprises a metal selected from the group consisting of Nb, Ta, Ti, Cr, and Ni or an alloy of at least two of said metals and has a thickness of at most 2 nm.

7. The transparent substrate of claim 1, wherein the oxide layer that is intercalated between the first underlying coating and said layer having properties in the infrared range has a thickness of between about 5 and 40 nm.

8. The transparent substrate of claim 1, wherein the first undercoating and the second overcoating are doped by a dopant.

9. The transparent substrate of claim 8, wherein the dopant is present in an amount of at most 2% atomic, compared to amount of silicon.

10. The transparent substrate of claim 8, wherein said dopant is boron or aluminum.

11. A transparent substrate, comprising a stack of thin layers on a carrier substrate, the stack of thin layers comprising:

$Si_3N_4/ZnO/Ag/NiCr/ZnO/Si_3N_4$ whereby properties of the stack are retained without modification when the carrier substrate is submitted to a thermal treatment of bending or tempering.

12. The transparent substrate of claim 11, wherein the carrier substrate is glass.

13. A transparent substrate, comprising a stack of thin layers on a carrier substrate, the stack of thin layers comprising:

$Si_3N_4/ZnO/Ag/NiCr/SnO_2/Si_3N_4$.

14. The transparent substrate of claim 13, wherein the carrier substrate is glass.

15. A transparent substrate, comprising a stack of thin layers on a carrier substrate, wherein the stack of thin layers comprises:

$Si_3N_4.Al/ZnO/Ag/NiCr/SnO_2/Si_3N_4.Al$.

16. The transparent substrate of claim 15, wherein the carrier substrate is glass.

17. A transparent substrate, comprising a stack of thin layers on a carrier substrate, wherein the stack of thin layers comprises a plurality of layers with properties in the infra-red range, and comprises in order:
   a) a first undercoating comprising a dielectric material;
   b) a layer having properties in the infra-red range;
   c) a primer metallic coating; and
   d) a second overcoating, comprising a dielectric material;
   wherein in order to prevent modification of properties of the stack when a carrier substrate thereof is submitted to a thermal treatment of bending or tempering;
   i) the first undercoating comprising a dielectric material has at least a first barrier layer for the diffusion of alkaline ions and oxygen; and
   ii) the second overcoating comprising a dielectric material has at least a second barrier layer for the diffusion of oxygen;
   iii) a first oxide layer is intercalated between the first undercoating and said layer having properties in the infra-red range, and a second oxide layer is intercalated between said primer metallic coating and the second overcoating, said first and second oxide layers being the same or different;
   the first barrier layer and second barrier layer each, independently, being selected from the group consisting of silicon nitride and silicon oxynitride; and
   wherein a), b), c), d), i), ii) and iii) each, independently and optionally, repeat at least one additional time to provide said plurality of layers in the stack having properties in the infra-red range.

18. The transparent substrate of claim 17, wherein the second oxide layer intercalated between the primer metallic coating and the second overcoating is a ZnO or $SnO_2$ layer.

19. The transparent substrate of claim 17, wherein the first undercoating and the second overcoating is a $Si_3N_4$ layer.

20. The transparent substrate of claim 17, wherein the carrier substrate is glass.

21. The transparent substrate of claim 17, wherein a difference in luminous transmission, TL, after bending or tempering up to a temperature of 640° C., is at most 2%, with an emissivity difference of at most 0.01.

22. The transparent substrate of claim 17, wherein said primer metallic coating comprises a metal selected from the group consisting of Nb, Ta, Ti, Cr, and Ni or an alloy of at least two of said metals and has a thickness of at most 2 nm.

23. The transparent substrate of claim 17, wherein oxide layer that is intercalated between the first underlying coating and said layer having properties in the infrared range has a thickness of between about 5 and 40 nm.

24. The transparent substrate of claim 17, wherein the first undercoating and the second overcoating are doped by a dopant.

25. The transparent substrate of claim 17, wherein the dopant is present in an amount of at most 2% atomic, compared to amount of silicon.

26. The transparent substrate of claim 17, wherein said dopant is boron or aluminum.

27. A transparent substrate, comprising a stack of thin layers on a carrier substrate, the stack of thin layers comprising:

$Si_3N_4/ZnO/Ag/NiCr/SnO_2Si_3N_4/ZnO/Ag/NiCr/SnO_2/Si_3N_4$.

28. The transparent substrate of claim 27, wherein the carrier substrate is glass.

29. A transparent substrate, comprising a stack of thin layers on a carrier substrate, wherein the stack of thin layers comprises:

$Si_3N_4.Al/ZnO/Ag/NiCr/SnO_2/Si_3N_4.Al/ZnO/Ag/NiCr/SnO_2/Si_3N_4.Al$.

30. The transparent substrate of claim 29, wherein the carrier substrate is glass.

* * * * *